United States Patent
Ogg et al.

(10) Patent No.: US 6,714,731 B2
(45) Date of Patent: Mar. 30, 2004

(54) ZOOM AND FOCUS CONTROL METHOD AND SYSTEM

(75) Inventors: Michelle Ogg, Loveland, CO (US); David K. Campbell, Loveland, CO (US); Gregory V Hofer, Loveland, CO (US); Masahiro Ohno, Tokyo (JP); Yoshihiro Yamazaki, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/792,318

(22) Filed: Feb. 23, 2001

(65) Prior Publication Data

US 2002/0118965 A1 Aug. 29, 2002

(51) Int. Cl.7 .................. G03B 17/00; G02B 15/14; G02B 15/22
(52) U.S. Cl. .............. 396/81; 396/82; 396/87; 359/691; 359/693; 359/698
(58) Field of Search .............. 396/79, 80, 81, 396/82, 87, 349; 359/680, 691, 693, 696, 698, 694

(56) References Cited

U.S. PATENT DOCUMENTS

| | | | | | |
|---|---|---|---|---|---|
| 5,028,773 A | * | 7/1991 | Hata | ..................... | 250/201.2 |
| 5,146,071 A | * | 9/1992 | Ookubo et al. | .......... | 250/201.2 |
| 5,264,963 A | * | 11/1993 | Ueyama | .................... | 359/695 |
| 5,371,631 A | * | 12/1994 | Takada | ....................... | 359/689 |

FOREIGN PATENT DOCUMENTS

| JP | 11-281869 | * 10/1999 | ............ G02B/7/04 |
|---|---|---|---|

* cited by examiner

*Primary Examiner*—Russell Adams
*Assistant Examiner*—Rochelle Blackman

(57) ABSTRACT

A focus lens and a zoom lens group having a first zoom lens and a second zoom lens are controlled separately from one another in an internal-focus camera. The positions of the focus lens and the second zoom lens in the zoom lens group are tracked, and are controlled to approach no closer to one another than a minimum safe distance to avert collisions between the focus lens and the second zoom lens.

2 Claims, 3 Drawing Sheets

ZOOM AND FOCUS CONTROL METHOD AND SYSTEM

CROSS-REFERENCE

The present invention is related to subject matter disclosed in the following co-pending patent applications:

1. United States patent application entitled, "Zoom and Focus Control System in an Optical System" U.S. Pat. No. 09/792,347, naming Gregory V. Hofer, David K. Campbell, Masahiro Ohno, and Yoshihiro Yamazaki as inventors and filed on even date herewith; and
2. United States patent application entitled, "Brightness Control for Auto-Focus in an Optical System" U.S. Pat. No. 09/792,348, naming Gregory V. Hofer, David K. Campbell, Masahiro Ohno, and Yoshihiro Yamazaki as inventors and filed on even date herewith.

FIELD OF THE INVENTION

This invention relates to photography, and more particularly to a method for controlling photographic lenses.

BACKGROUND

An internal-focus lens group is often used in a camera to reduce the size and weight of the overall lens. Referring to FIG. 1, a standard internal-focus lens 100 is shown. The mechanism or mechanisms for moving the lenses, as well as any control electronics, are not shown for clarity. The internal-focus lens 100 includes a number of other lenses, including a focus lens 102, which itself can include one or more elements. The focus lens 102 can move between a rear focusing position 120 to focus on an object at infinity and a front focusing position 122 to perform macro focusing. Macro focusing is typically utilized when a photographer wishes to focus on an object located particularly close to the camera itself. In one embodiment, the focus lens 102 focuses an image on an image detector 130 such as a charge-coupled device (CCD), or photographic film. In another embodiment, the image detector 130 is not used, and the focus lens 102 creates an image that can be viewed with the human eye. In such an embodiment, the lens 100 may be used in a binocular or telescope device, or other type of viewing device. The internal-focus lens 100 can include a single zoom lens adapted to move relative to the focus lens 102, or a zoom lens group 104 having a first zoom lens 106 and a second zoom lens 108 adapted to move relative to one another and the focus lens 102. Each zoom lens 106, 108 can include one or more elements. By moving the zoom lenses 106, 108 relative to one another along the optical axis 110, the degree of magnification can be controlled. When the zoom lenses 106, 108 are close together, they are in a telephoto position where a greater degree of magnification is provided. When the zoom lenses 106, 108 are further apart, they are in a wide-angle position where a lesser degree of magnification is provided. The second zoom lens 108 moves forward to a front zoom position 124 when the zoom lenses 106, 108 are closest together for the greatest magnification, and moves backward to a rear zoom position 126 when the zoom lenses 106, 108 are furthest apart for the greatest wide angle view.

In order to save space within a camera, the front focusing position 122 of the focus lens 102 may be located in front of the rear zoom position 126 of the second zoom lens 108. Thus, the focus lens 102 can collide with the second zoom lens 108 within a potential collision zone 128 between the front focusing position 122 and the rear zoom position 126. Such a collision can damage the focus lens 102 and/or the second zoom lens 108. During normal operation of the camera, the focus lens 102 and the second zoom lens 108 typically will not collide, as the macro feature is rarely used in normal operation, and it is usually used when the zoom lens group 104 is in telephoto position. However, even a single collision between the focus lens 102 and the second zoom lens 108 can ruin those lenses, requiring the user to repair them at some expense, or discard the camera altogether.

SUMMARY

A focus lens and a zoom lens group are controlled in an internal focus camera to maintain a minimum safe distance between the focus lens and an adjacent zoom lens.

In one aspect of the invention, the focus lens and a zoom lens group having a first zoom lens and a second zoom lens are controlled separately from one another.

In another aspect of the invention, the positions of the focus lens and the second zoom lens in the zoom lens group are tracked.

In another aspect of the invention, the focus lens and the second zoom lens are controlled to approach no closer to one another than a minimum safe distance. In this way, collision between the focus lens and the second zoom lens is prevented, thereby preventing damage to the lenses.

The invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION

Figure 2:
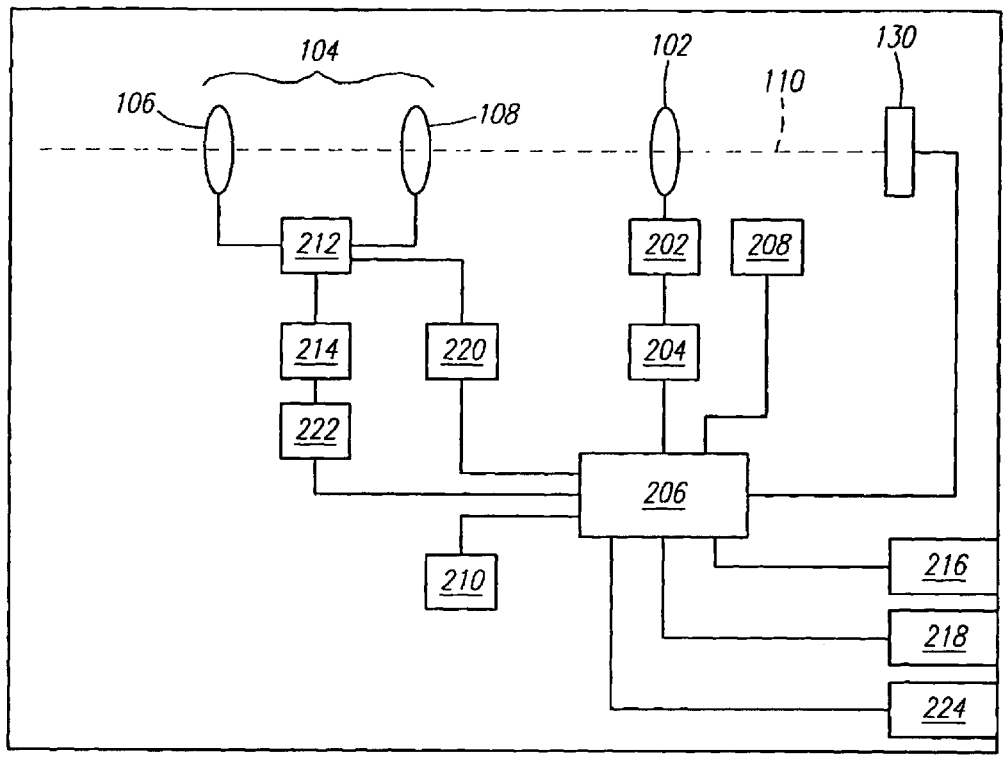
FIG. 2 is a block diagram of a camera.

Referring to FIG. 2, a block diagram of a camera 200 is shown. For clarity, only the components necessary to explain the embodiments of the invention are shown. The lens 100 includes the focus lens 102 and the zoom lens group 104, which are substantially aligned along the optical axis 110. In one embodiment, the zoom lens group 104 includes a first zoom lens 106 and a second zoom lens 108. The focus lens 102 may include one or more separate optical elements. The first zoom lens 106 and the second zoom lens 108 each may include one or more separate optical elements. An image detector 130 is located substantially on the optical axis 110, on the opposite side of the focus lens 102 from the zoom lens group 104, such that an image may be focused on the image detector 130 by the focus lens 102. In one embodiment, the image detector 130 is a CCD, but the image detector 130 maybe another device such as a metal-oxide semiconductor, or may be photographic film. The lens 100 of the camera 200 collects light that passes along the optical axis 110 through the zoom lens group 104 and the focus lens 102 before it is focused onto the image detector 130.

The focus lens 102 is operably connected to a stepper motor 202 controlled by a motor driver 204, which in turn is electrically connected to a controller 206. A motor driver 204 is a standard electrical component used to drive a stepper motor 202, and controls the motor 202 to ensure that it moves in discrete, substantially equal steps. The stepper motor 202 moves the focus lens 102 in discrete steps substantially along the optical axis 110, based on commands issued by the controller 206. In other embodiments, a motor other than a stepper motor 202 may be used.

The controller 206 may be an application-specific integrated circuit (ASIC), a microprocessor, or any other information handling device adapted to control the focus lens 102. The controller 206 controls the focus lens 102 to automatically focus the camera 200. Automatically focusing a camera utilizing a controller 206 is standard in the art, and may be performed in a number of different standard ways. The controller 206 is connected to a memory storage unit 210. In one embodiment, the memory storage unit 210 is random-access memory (RAM), but may be any other memory storage device, such as flash memory.

In one embodiment, the controller 206 is also connected to a sensor 208. The sensor 208 senses when the focus lens 102 is in a particular reference position, which may be referred to as the home position. When the sensor 208 is in the home position, it transmits a signal to the controller 206. The controller 206 then preferably stores in a memory storage unit 210 the information that the focus lens 102 is in the home position. In one embodiment, the position of the focus lens 102 is a register or combination of registers in the memory storage unit 210, where the position of the focus lens 102 is stored as zero when the focus lens 102 is in the home position. The stepper motor 202 and the motor driver 204 act both to move the focus lens 102 and measure its current position. The focus lens 102 is initialized in the home position, at which the point sensor 208 signals the controller 206 that the focus lens is located in the home position. That position is stored in the memory storage unit 210. As the stepper motor 202 moves the focus lens 102 in discrete increments in one direction along the optical axis 110, the controller 206 increments the focus lens position stored in the memory storage unit 210 one unit for each discrete increment. In one embodiment, the controller 206 increments the focus lens position stored in the memory storage unit 210 substantially at the same time as it transmits a command to the stepper motor 202 via the motor driver 204 to move one discrete increment in one direction away from the home position. Similarly, the controller 206 decrements the focus lens position stored in the memory storage unit 210 substantially at the same time as it transmits a command to the stepper motor 202 via the motor driver 204 to move one discrete increment in the opposite direction toward the home position. The position of the focus lens 102 along the optical axis 110 at any point in time can then be determined by the controller 206 by reading the focus lens position data stored in the memory storage unit 210.

The lenses 106, 108 forming the zoom lens group 104 are movable substantially along the optical axis 110. In one embodiment, the lenses 106, 108 of the zoom lens group 104 are connected to a rotating lens barrel cam mechanism 212, which is standard in the art. The rotating lens barrel cam mechanism 212 provides for motion of the lenses 106, 108 substantially along the optical axis 110, and in one embodiment provides for substantially equal linear displacement of each lens 106, 108 along the optical axis when the zoom lens group 104 is moved, to provide for smooth motion among a variety of magnification settings. The particular mechanical implementation of the rotating lens barrel cam mechanism 212 is not critical.

A DC motor 214 is connected to rotating lens barrel cam mechanism 212. In one embodiment, the DC motor 214 drives the motion of the rotating lens barrel cam mechanism 212 via a set of gears between the DC motor 214 and the rotating lens barrel cam mechanism 212. However, other mechanical interfaces between the DC motor 214 and the rotating lens barrel cam mechanism 212 may be used, if desired. Further, another device than the DC motor 214 may be used to drive the rotating lens barrel cam mechanism 212.

In one embodiment, the rotating lens barrel cam mechanism 212 is mechanically connected to a slide potentiometer 220, which in turn is connected to the controller 206. The slide potentiometer 220 is a standard component that measures the position of the lenses 106, 108 along the optical axis 110 and provides feedback about that measured position to the controller 206 for controlling the motion of the lenses 106, 108. In one embodiment, the slide potentiometer 220 includes a mechanical slide component mechanically connected to the rotating lens barrel cam mechanism 212 via one or more gears, and provides a variable resistance depending on the position of that mechanical slide. However, another type of position feedback device, such as a motor shaft encoder or a linear optical encoder, may be used to sense and control the motion of the zoom lens group 104.

A motor driver 222 is standard in the art, and is connected to the DC motor 214 in one embodiment. The controller 206 moves the zoom lens group 104 by transmitting a signal to the motor driver 222, which then provides a corresponding current to the DC motor 214, causing it to move the rotating lens barrel cam mechanism 212, which in turn moves the zoom lens group 104. The setting of the slide potentiometer 220 changes as a result, changing the resistance of the slide potentiometer 220 to reflect the new position of the rotating lens barrel cam mechanism 212. Because the resistance of the slide potentiometer 220 varies with the position of the slide, and each position of the slide in the slide potentiometer 220 corresponds to a particular position of the lenses 106, 108, the controller 206 can determine the position of the lenses 106, 108 at any point in time by sensing the resistance of the slide potentiometer 220.

A zoom control 216 is a control accessible to a user of the camera 200, and may be a rocker switch, touch switch, or any other device capable of recognizing user input. The particular configuration of the zoom control 216 is not critical to the invention. The zoom control 216 is connected to the controller 206, such that the controller 206 can adjust the zoom lens group 104 based on user input received through the zoom control 216.

A focus control 224 is a control on the camera 200 accessible to a user, through which the user controls the autofocus function of the camera. In one embodiment, the focus control 224 is the shutter button (not shown), where the depression of the shutter button to a first position allows the user to initiate the autofocus function. The instigation of an autofocus function upon the partial depression of a shutter button to a first position is standard. In another embodiment, the focus control 224 may be a separate rocker switch, touch switch, or any other device capable of recognizing user input. The particular configuration of the focus control 224 is not critical to the invention.

Similarly, a macro control 218 may be provided on the camera 200, where the macro control 218 is accessible to a user of the camera 200, through which the user controls the macro function for closeup focusing. The macro control 218 is connected to the controller 206, such that the controller 206 can adjust the focus lens 102 based on user input received through the macro control 228. The focus lens 102 can move through a range of positions close to the front focusing position 122, including the front focusing position 122, when the user selects the macro function via the macro control 218. In another embodiment, the macro control 218 is used to position the focus lens 102 in a closeup focusing position near the front focusing position 122. In another embodiment, the macro control 218 is not used, and the camera 200 senses when an object is close enough for macro focusing, as part of its standard autofocus function. The autofocus function of a camera is standard in the art, and may be implemented in any manner in the camera 200. The particular implementation of the autofocus function, whether in hardware, software or a combination of both, is not critical.

Figure 3:
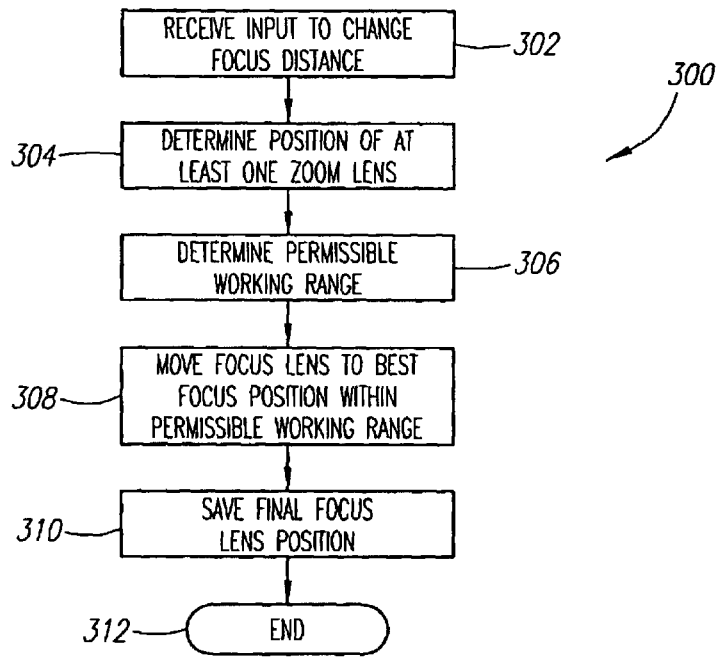
FIG. 3 is a flow chart of a method for providing a minimum safe distance between the focus lens and a zoom lens.

Referring to FIG. 3, a method 300 for focus control in a camera 200 is shown. The method 300 is utilized where a particular setting of the zoom lens group 104 has been chosen, and the focus distance changes. This situation occurs where a particular magnification setting has been selected with the zoom control 216, after which the user selects a different object for imaging at a different distance from the camera. For example, the user may select wide-angle magnification with regard to a person standing close to the camera, then move the camera to focus upon a building in the distance without changing the magnification.

First, in block 302, the controller 206 receives input to change the focus distance of the focal lens 102. This input may be received in at least two different ways. First, the user may instruct the camera 200 to autofocus on a subject. In one embodiment, this is performed by depressing the shutter button on the camera 200 to a first position. The user may utilize the macro control 218 to transmit input to the is controller 206 indicating that the subject to be focused upon is close to the camera 200. Second, the user may simply move the camera to focus on a different object, such that the autofocus function of the camera 200 transmits information to the controller 206 to change the focus distance of the focus lens 102. Other sources of input may be used if desired. For example, if the lens 100 is associated with a web-enabled camera that is located remotely from the user, the user may transmit a signal from an information handling system to the web-enabled camera over a communications network, where that signal is related to the control of the focus lens 102. That signal input is received by the controller 206.

Next, in block 304, the controller 206 determines the position of the zoom lenses 106, 108. As described above, in one embodiment the controller 206 determines the position of the lenses 106, 108 by checking the resistance of the slide potentiometer 220. The controller 206 may do so by applying a voltage to the slide potentiometer 220, then measuring the current that flows through the slide potentiometer 220. Because the resistance of the slide potentiometer 220 varies with the position of the slide, and each position of the slide in the slide potentiometer 220 corresponds to a particular position of the lenses 106, 108, the controller 206 can determine the position of the lenses 106, 108 at any point in time by checking the resistance of the slide potentiometer 220. The controller 206 may store this position data in the memory storage unit 210 or in a cache within the controller 206, if desired.

Next, in block 306, the controller 206 determines the permissible working range of the focus lens 102, based on the position of the zoom lenses 106, 108 determined in block 304. The permissible working range is the range of possible positions of the focus lens 102 along the optical axis 110 within which the focus lens 102 does not approach closer than a minimum safe distance to the second zoom lens 108. The minimum safe distance is a distance chosen to provide a margin of safety between the lenses 102, 108 and prevent their collision. In one embodiment, the minimum safe distance is substantially five millimeters. By defining a permissible working range, the focus lens 102 can be prevented from colliding with the second zoom lens 108 as the focus lens 102 is moved to a focus position. In one embodiment, the controller 206 determines the position of the front boundary of the permissible working range by subtracting the minimum safe distance from the position of the second zoom lens 108 determined in block 304. In such an embodiment, the positions of the lenses 102, 106, 108 are measured along the optical axis 110, where the zero point corresponds to the rear focusing position 120, and position information is measured in positive numbers extending forward along the optical axis 110 from the rear focusing position 120. Other coordinate systems and methods of measuring are possible. In one embodiment, the rear boundary of the permissible working range is the rear focusing position 120.

Next, in block 308, the controller 206 moves the focus lens 102 to the best focus position within the permissible working range, which may or may not be the same position as the absolute best position for the focus lens 102. In one embodiment, the best focus position within the permissible working range is determined using an iterative process, where the focus lens 102 is moved in discrete steps based on the value at each step of a focus figure of merit (FOM). The use of a focus FOM is standard. In one embodiment, the focus FOM is a measure of image contrast as sensed by, for example, the image detector 130. Focus is typically related to contrast, such that the contrast is higher as the focus improves. In one embodiment, standard dedicated hardware is used to compute the focus FOM from image contrast sensed by the image detector 130. In another embodiment, standard circuitry in the controller 206 is used to compute the focus FOM from image contrast sensed by the image detector 130. Other bases for a focus FOM may be used, if desired.

To move the focus lens 102 to the best focus position within the permissible working range, the focus lens 102 is moved within the permissible working range until a position of the focus lens 102 is reached where the focus FOM is maximized. The best focus position within the permissible working range may not be the same as the absolute best focus position absent the constraint of the permissible working range. As one example, if the absolute best position for the focus lens 102 falls in front of the front boundary of the permissible working range, the best position for the focus lens 102 in the permissible working range is the front boundary of that permissible working range. Thus, the focus lens 102 can be moved as close as possible to the absolute best focus distance without damaging the second zoom lens 108.

In one embodiment, a peak finding algorithm is used to move the focus lens 102. The position of the focus lens 102 is tracked as it is moved. In one embodiment, the controller 206 checks the initial position of the focus lens 102 by reading position data from the memory storage unit 210, where that position data is stored in the memory storage unit 210 as described above. The controller 206 may determine the initial position of the focus lens 102 in other ways, if desired. Next, the focus lens 102 is moved in a direction along the optical axis 110 by the stepper motor 202 in conjunction with commanded moves to the stepper motor driver 204, which in turn is controlled by the controller 206. The controller 206 tracks the position of the focus lens 102 by updating focus lens 102 position data within the memory storage unit 210 in conjunction with the motion commands transmitted to the stepper motor 202 via the stepper motor driver 204, such that the new position of the focus lens 102 is stored in the memory storage unit 210. Next, it is determined whether the focus FOM has increased or decreased from the initial position of the focus lens. If the focus FOM has increased, then the focus lens 102 is moved again in that direction until a peak is found or a boundary of the permissible working range is reached. If the focus FOM has decreased, then the focus lens 102 is moved again in the opposite direction, until a peak is found or a boundary of the permissible working range is reached. As above, the focus lens 102 is moved in discrete steps, and its position at each step is tracked by the controller 206. When the focus lens 102 has reached a location on the optical axis substantially at a peak focus FOM, or when the focus lens 102 reaches a boundary of the permissible working range, the controller 206 stops the focus lens 102 at a final focus lens 102 position. As described above, the focus lens 102 is moved in discrete steps and its position is tracked by the controller 206.

Because the stepper motor 202 moves the focus lens 102 in discrete steps, the best focus position within the permissible working range may not correspond precisely to a position into which the focus lens 102 can be placed. If so, the controller 206 controls the stepper motor 202 to move the focus lens 102 into the discrete position closest to the best position within the permissible working range, while ensuring that the focus lens 102 does not move out of the permissible working range. Next, in block 310, the controller 206 saves the final focus lens 102 position, and additionally saves the associated focus distance. The method 300 then ends at block 312.

Figure 4:
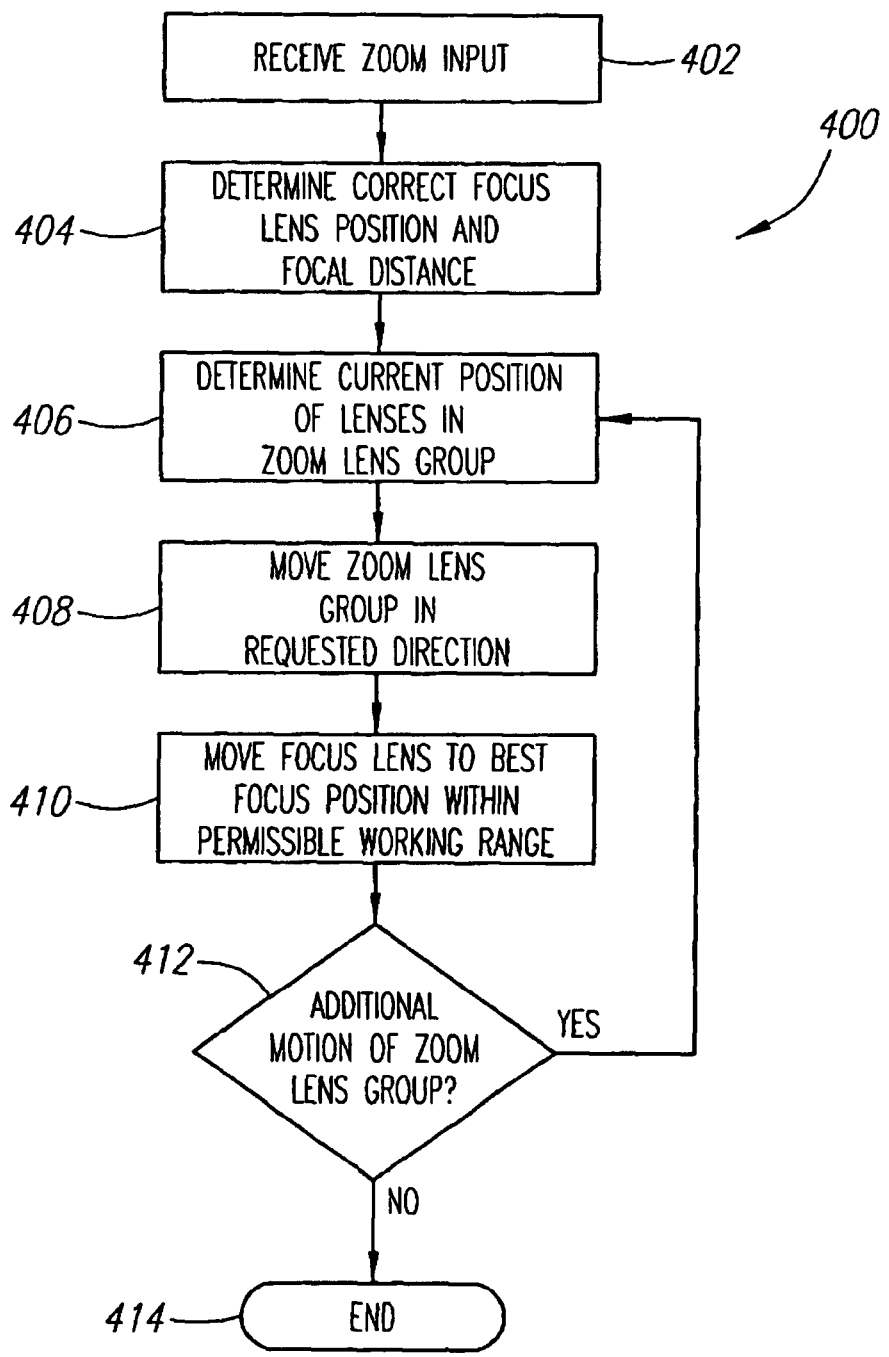
FIG. 4 is a flowchart of one method of the invention.

Referring to FIG. 4, a method 400 for zoom control in a camera 200 is shown. The method 400 is utilized where a particular focus setting of the focus lens 102 has been chosen, and the magnification changes. This situation occurs where a particular focus setting has been set by the controller 206 or selected with the macro control 218, after which the magnification selected with the zoom control 216 camera 200 is changed to zoom in on an object or zoom out from an object. For example, the user may focus on a flower close to the camera with the macro control 218, then select a higher degree of magnification with the zoom control 216 to better view the details of the flower.

First, in block 402, the controller 206 receives input to change the magnification of the zoom lens group 104. In one embodiment, the user utilizes the zoom control 218 to change magnification, where the zoom control 216 transmits input to the controller 206. Other sources of input may be used if desired. For example, if the lens 100 is associated with a web-enabled camera that is located remotely from the user, the user may transmit a signal from an information handling system to the web-enabled camera over a communications network, where that signal is related to the control of the zoom lens group 104. That signal input is received by the controller 206.

Next, in block 404, the controller 206 determines the position of the focus lens 102 and the focal distance. In one embodiment, the controller 206 checks the position of the focus lens 102 by reading position data from the memory storage unit 210, where that position data is stored in the memory storage unit 210 as described above.

The controller 206 may determine the position of the focus lens 102 in other ways, if desired.

Next, in block 406, the controller 206 determines the initial position of the zoom lenses 106, 108. As described above, in one embodiment the controller 206 determines the position of the lenses 106, 108 by checking the resistance of the slide potentiometer 220. The controller 206 may do so by applying a voltage to the slide potentiometer 220, then measuring the current that flows through the slide potentiometer 220. Because the resistance of the slide potentiometer 220 varies with the position of the slide, and each position of the slide in the slide potentiometer 220 corresponds to a particular position of the lenses 106, 108, the controller 206 can determine the position of the lenses 106, 108 at any point in time by checking the resistance of the slide potentiometer 220. The controller 206 may store this position data in the memory storage unit 210 or within a cache within the controller 206, if desired.

Next, in block 408, the controller 206 moves the zoom lens group 104 a discrete distance along the optical axis 110 in the direction corresponding to the magnification selected by the input received in block 402. The controller 206 moves the zoom lens group 104 as described above, by transmitting a signal to the motor driver 222, which in turn drives the DC motor 214 that moves the rotating lens barrel cam mechanism 212 connected to the zoom lens group 104.

Next, in block 410, the controller 206 moves the focus lens 102 to the best focus position within the permissible working range that achieves focus for the original focus distance at the new position of the zoom lens group 104. In one embodiment, block 410 is performed in a manner as disclosed in the copending United States patent application entitled "Brightness Control for Auto-Focus in an Optical System" (HP Docket No. 10006923-1), naming Gregory V. Hofer, David K. Campbell, Masahiro Ohno, and Yoshihiro Yamazaki as inventors and filed on even date herewith.

Next, in block 412, the controller 206 determines if additional motion of the zoom lens 104 is required. In one embodiment, the controller 206 makes this determination by checking the zoom control 218 to determine if the user continues to select a change in magnification. If an additional change to the magnification is required, the method 400 returns to block 406. However, if no additional change in magnification is required, the method 400 ends at block 414.

Figure 1:
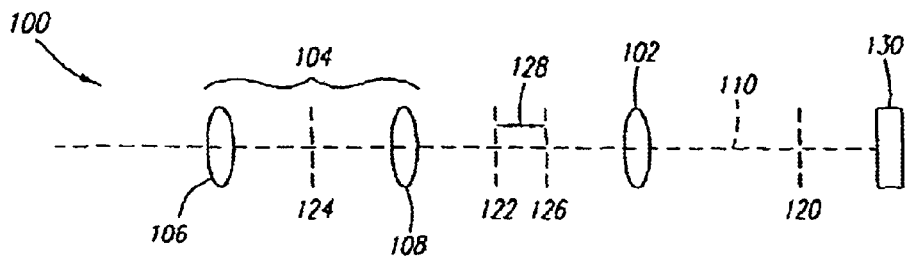
FIG. 1 is a schematic view of the lens configuration of a prior art camera, showing the zone in which a focus lens can collide with a zoom lens.
Figure 5:
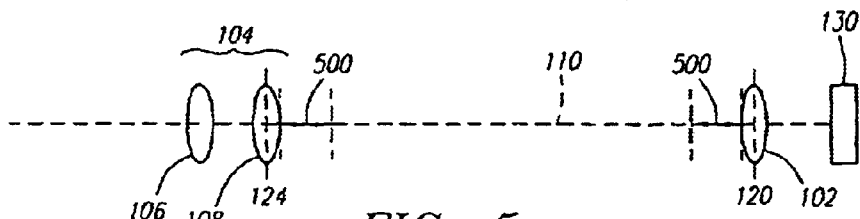
FIG. 5 shows an exemplary lens configuration of the invention.

Referring to FIG. 5, an exemplary configuration of the lens 100 is shown. In this example, the user is taking a telephoto photograph of a distant object, such that the object may be considered to be at infinity. Thus the focus lens 102 is at the rear focusing position 120. As described above, the lens 100 is configured for telephoto imaging, after receiving user input to zoom in on an object. To configure the zoom lens group 104 for a telephoto image, the first zoom lens 106 and the second zoom lens 108 are moved relatively close to one another along the optical axis 110, where the second zoom lens 108 is separated from the focus lens 102 by a substantial distance along the optical axis 110. The minimum safe distance 500 from both the second zoom lens 108 and the focus lens 102 is shown, thereby showing that the second zoom lens 1 08 and the focus lens 102 are further away from each other than the minimum safe distance 500.

Figure 6:
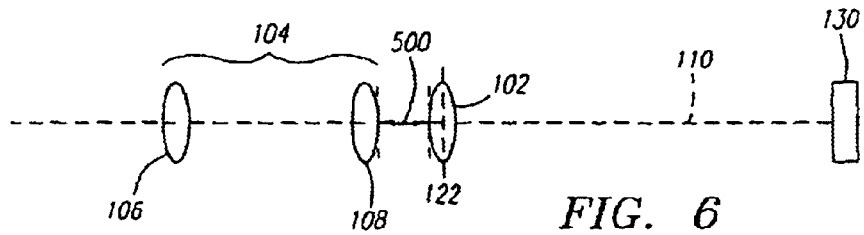
FIG. 6 shows an exemplary lens configuration of the invention.

Referring to FIG. 6, an exemplary configuration of the lens 100 is shown. In this example, the user is taking a wide angle photograph of a close-up object at macro focusing distance. Thus, the focus lens 102 is at the front focusing position 122. As described above, the lens 100 is configured for wide angle imaging, after receiving user input to zoom out from an object. The zoom lens group 104 is set for a wide angle image, such that the first zoom lens 106 and the second zoom lens 108 are relatively far apart from one another along the optical axis 110. To configure the zoom lens group 104 for a wide-angle image, the lenses 106, 108 of the zoom lens group 104 are moved relatively further from each other along the optical axis, such that the second zoom lens 108 approaches the focus lens 102 in the front focusing position 122. As the second zoom lens 108 approaches the focus lens 102, the second zoom lens 108 is stopped by the controller 206 at the minimum safe distance 500 from the focus lens 102, so that the second zoom lens 108 is not moved all the way to the rear zoom position 126. In this way, the method 300 prevented the second zoom lens 108 from colliding with the focus lens 102.

Figure 7:
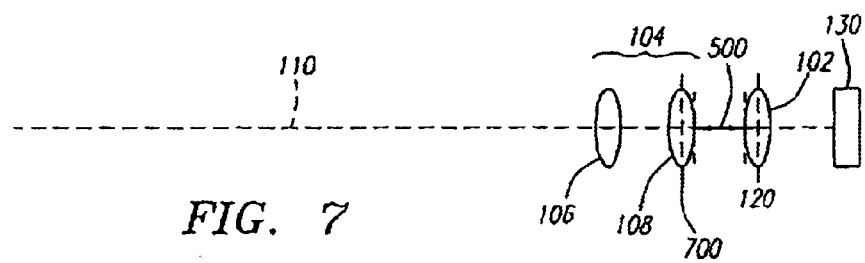
FIG. 7 shows an exemplary lens configuration of the invention.

Referring to FIG. 7, a power-off position of the zoom lens group 104 and the focus lens 102 is shown. The power-off position is the position to which the zoom lens group 104 and the focus lens 102 are moved as the camera 200 is shut down. The focus lens 102 is moved along the optical axis 110 to a home position, which is the closest permissible position to the image detector 130. In one embodiment, the home position of the focus lens 102 is the rear focusing position 120. However, the home position of the focus lens 102 may be located between the rear focusing position 120 and the image detector 130. The home position of the focus lens 102 is chosen to ensure that the focus lens 102 does not inadvertently collide with the image detector 130, because such a collision may damage either or both of those components. In the power-off position, the zoom lens group 104 is also moved back along the optical axis 110 to a position near the focus lens 102. In FIG. 7, the home position of the focus lens 102 is equivalent to the rear focusing position 120, such that the second zoom lens retracted position 700 is located substantially at the minimum safe distance 500 from the rear focusing position 120.

Figure 8:
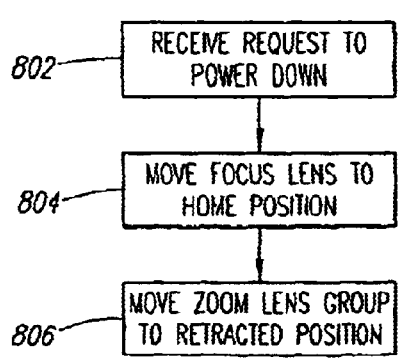
FIG. 8 is a flowchart of another method of the invention.

Referring to FIG. 8, a method 800 for moving the lens 100 to the power-off position is shown. In block 802, the controller 206 receives a request to power down the camera 200. In one embodiment, such a request is received from a power switch (not shown) on the camera 200, which is depressed or otherwise activated by a user when the user wishes to turn off the camera 200.

In response to the request received in block 802, in block 804 the controller 206 moves the focus lens 102 to the home position. As described above, the home position is located along the optical axis 110 at the closest permissible distance to the image detector 130. In one embodiment, the home position is the same as the rear focusing position 120. The controller 206 moves the focus lens 102 as described above, by transmitting a command to the stepper motor driver 204, which in turn drives the stepper motor 202 to move the focus lens 102 to the closest permissible position to the image detector 130, as commanded. The zoom lens group 104 is held stationary during block 804.

Next, in block 806, the zoom lens group 104 is moved to a power-off position, which may also be referred to as a retracted position. As described above, the power-off position of the zoom lens group 104 is the position where the second zoom lens 108 is positioned at a second zoom lens retracted position 700, located no closer than the minimum safe distance 500 from the home position of the focus lens 102. The zoom lens group 104 is moved to the power-off position by a command transmitted from the controller 206 to the motor driver 222, which in turn drives the DC motor 214 to move the rotating lens barrel cam mechanism 212. The zoom lens group 104 is thus moved to the power-off position, where the second zoom lens 108 is at the second zoom lens retracted position 700. In one embodiment, the second zoom lens retracted position 700 is permanently stored in the controller 206 or the memory storage unit 210. However, the second zoom lens retracted position 700 may be calculated in block 806, if desired. By moving the focus lens 102 to its home position before moving the zoom lens group 104 to its power-off position, and by moving the second zoom lens 108 no closer than the minimum safe distance 500 to the focus lens 102, collisions between the focus lens 102 and the second zoom lens 108 are prevented.

While the embodiments above have been described in terms of components of a camera 200, the method 300 may be practiced with other optical image acquisition devices, such as binoculars, telescopes, spotting scopes, or other optical devices.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A method for controlling a lens group having a focus lens and a zoom lens group along an optical axis, where the zoom group includes at least one zoom lens, comprising:

receiving input to change the position of a selected one of the focus lens and the zoom lens group, wherein said receiving input comprises receiving input to change the position of the focus lens; and separately controlling the positions of the focus lens and the zoom lens group along the optical axis such that the focus lens and the zoom lens approach substantially no closer to one another than a selected minimum safe distance, wherein said separately controlling comprises determining the initial position of the at least one zoom lens and determining a permissible working range by subtracting a minimum safe distance from said initial position of the at least one zoom lens.

2. A method for controlling a lens group having a focus lens and a zoom lens group along an optical axis, where the zoom lens group has a first zoom lens and a second zoom lens, comprising:

receiving input to change the position of the focus lens;

determining the initial position of the second zoom lens;

determining a permissible working range by subtracting a minimum safe distance from said initial position of said second zoom lens;

selecting a focus figure of merit;

moving the focus lens in one direction along the optical axis;

tracking the position of the focus lens along the optical axis; and, for each selected magnification of the zoom lens group and focus lens, if the focus figure of merit increases, moving the focus lens again in said one direction to a final position that is no further than a boundary of said permissible working range; and if the focus figure of merit decreases, moving the focus lens again in a direction opposite said one direction to a final position that is no further than a boundary of said permissible working range.

* * * * *